2,889,386
ARC MELTING

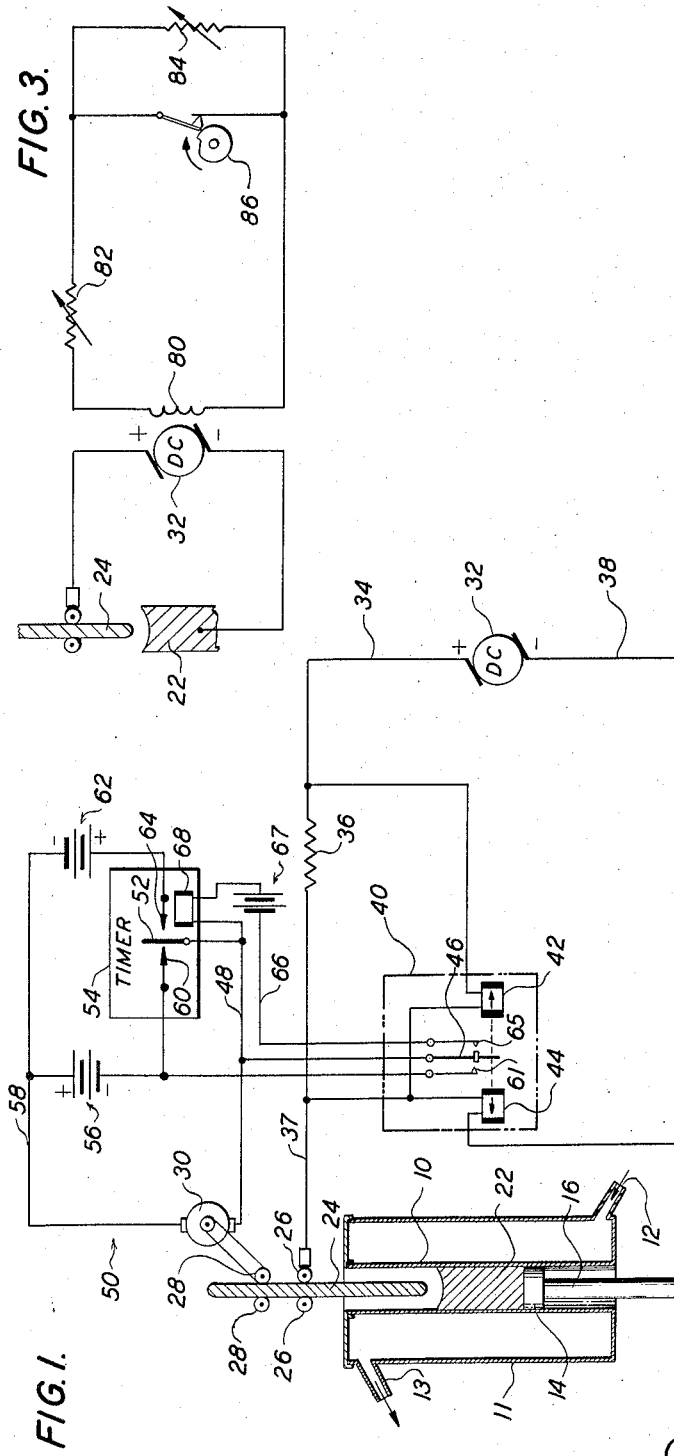

Helmut Gruber and Helmut Scheidig, Hanau, Germany, assignors to W. C. Heraeus, G.m.b.H., Hanau, Germany Application March 16, 1956, Serial No. 572,155

Claims priority, application Germany March 19, 1955

5 Claims. (Cl. 13—13)

This invention relates to methods and apparatus for arc melting of metals.

Arc melting furnaces are commonly used to melt metals having high melting points, such as titanium, zirconium and molybdenum.

A typical arc melting furnace includes a water-cooled crucible adapted to catch metal melted from an arc. In one type of arc melting furnace, an upright and consumable electrode of the metal to be melted is disposed above the crucible, and current is passed between the electrode and the surface of the molten metal in the crucible to form an arc which melts the lower tip of the electrode and allows melted metal to fall into the crucible. This operation may take place in a high vacuum or in an inert gas at any pressure, but usually is conducted at some reduced pressure. The electrode is continuously fed downwardly as melting progresses, and usually the crucible has a movable bottom which is lowered so that the spacing between the lower tip of the electrode and the surface of the melted metal remains substantially constant, the spacing being somewhat critical for proper operation.

A troublesome problem in arc melting furnaces is the tendency for the arc to stray from its desired path between the tip of the electrode and the surface of the melted metal in the crucible. For example, undersired "side arcing" sometimes develops between an intermediate portion of the electrode and a part of the crucible wall above the molten metal, producing undesired results. Side arcing causes the electrode to melt at a point above its lower end, and if permitted to continue, the electrode may be melted in two above its lower end, permitting a sizeable piece of metal to fall unmelted into the crucible. This would produce an imperfect ingot and reduce its value. Another difficulty is that if the side arcing is permitted to continue, a hole may be burned in the wall of the crucible, permitting water from the water jacket surrounding the crucible to flow in on the molten metal and cause a dangerous explosion.

This invention provides methods and apparatus for eliminating or substantially reducing undesired side arcing. This invention provides an arc furnace and methods for operating arc furnaces which insure that the electrode melts off at its lower tip only, and does not permit side arcing to burn holes in the crucible.

In terms of method, the invention contemplates the method of arc melting metal by forming an electric arc between two electrodes and making a temporary and effective variation in the conditions affecting the arc to reduce substantially the deviation of the arc from the desired path between the electrode.

In terms of apparatus, one embodiment of the invention includes an arc melting furnace having a first electrode and a second electrode spaced from the first. Means are provided for passing an arc between the two electrodes to melt the metal. Means are also provided for sensing the amount of current passing through the electrode, and means are provided for adjusting the spacing between the electrode in response to the said current.

With this embodiment, when the current passing through the electrode exceeds a predetermined amount due to side arcing, a circuit is actuated to reduce temporarily the spacing between the two electrodes to cause the side arcing to extinguish. Preferably, the circuit also includes means for increasing the spacing between the electrodes after the side arcing has been extinguished so that proper spacing between the electrodes is automatically restored for normal operation. Also in the preferred form, the circuit includes means for sensing the voltage difference between the two electrodes which actuates a circuit to reduce the spacing between the two electrodes until the voltage difference between them is reduced to the proper value for normal operation.

Thus, with the preferred apparatus, when undesired side arcing begins, one electrode is momentarily advanced toward the other, reducing the direct-path resistance between the two electrodes, and causing the side arcing to extinguish. The spacing between the two electrodes is then increased to restore normal arcing. If the spacing, or voltage, exceeds a predetermined value, the electrodes are brought closer together until the optimum voltage difference between them is obtained.

In another form of the invention, direct current is used to form an arc between the two electrodes and an alternating voltage is superimposed on the direct current. The magnitude of the alternating voltage is such that unwanted side arcing is extinguished when the alternating voltage opposes the direct current. The arc between the electrodes is also temporarily reduced. When the alternating voltage reinforces the direct current, the arc is restored to its normal operating condition. The restoration of the arc practically always occurs along the desired direct path between the two electrodes because conditions are most favorable for that path due to the incandescence of the two electrodes, e.g., the glowing material on the lower end of the electrode and the surface of the molten metal in the crucible. Thus, by pulsing the current through the electrode, side arcing is prevented or quickly eliminated if its starts.

In a third embodiment of the invention, the current forming the arc is temporarily interrupted. This interruption of current can be for such a short time that a very small arc remains between the electrode tip and the surface of the molten metal so that when the current is again supplied the arc is immediately restored to its desired value. When the current is interrupted for an appreciable length of time so that the arc fades out completely, conventional arc-striking equipment is used to reignite the arc.

The invention will be more clearly understood from the following detailed description taken in conjunction with the accompanying drawings in which:

Fig. 1 is a fragmentary schematic elevation of an arc furnace and a circuit diagram for temporarily reducing and increasing the spacing between the electrode and the surface of the molten metal in the crucible.

Fig. 2 is a fragmentary schematic elevation of the lower tip of the electrode disposed over the surface of the molten metal, and a circuit diagram for imposing an alternating voltage on a direct current applied between the electrode and the molten metal; and Fig. 3 is a fragmentary schematic elevation of the lower tip of the electrode disposed over the surface of the molten metal, and a circuit diagram for temporarily interrupting current supplied between the electrode and the molten metal.

Referring to Fig. 1, a vertical and cylindrical crucible 10 is surrounded by an annular water jacket 11 having an inlet 12 and an outlet 13. The crucible has a movable bottom 14 which is mounted on the upper end of an externally threaded piston 16 which passes down through an internally threaded boss 18 provided in the center of a bevel gear 19. A driving gear 20 on a motor 21, controlled by conventional means (not shown), rotates the bevel gear 19 to move the piston and crucible bottom up and down as required to maintain a constant distance between the surface of a molten metal 22 in the crucible and the lower tip of vertical electrode 24 extending down into the crucible. The electrode is made of metal which is to be melted.

A first set of rollers 26, driven by conventional means (not shown), serve to advance the electrode downwardly at a normal rate to maintain a substantially constant spacing between the lower tip of the electrode and the surface of the molten metal. A second pair of rollers 28 are driven by a motor 30 to override rollers 26 in response to electric signals as described below.

A source of direct current 32 has its positive terminal connected through a lead 34, a resistor 36, a lead 37 and rollers 26 to the electrode 24. The negative terminal of the direct current source is connected by a flexible lead 38 to the piston 16 so that the molten metal in the crucible serves as a second electrode. A differential relay 40 has a first coil 42 connected across the resistance 36 to sense the amount of current flowing through the first electrode. A second coil 44 in the differential relay is connected across leads 37 and 38 to measure the voltage difference between the first and second electrodes. An armature 46 in the differential relay is connected to a lead 48, one end of which is connected to one side of the motor 30 to form part of a motor control circuit 50. The other end of lead 48 is connected to an armature 52 in a timer 54. The positive terminal of a first source 56 of motor current is connected to a lead 58 which is connected to the side of the motor 30 opposite from that of lead 48. The negative side of source 56 is connected to a first contact 60 in the timer, and to a contact 61 in the differential relay. The negative side of a second source 62 of motor current is connected to lead 58, and the positive side of source 62 is connected to a second contact 64 in the timer. A second contact 65 in the differential relay is connected in series with lead 66, a timer battery 67, a timer coil 68, and lead 48 to form the circuit to actuate the timer.

The operation of the apparatus of Fig. 1 is as follows:

The current supplied from source 32 ordinarily flows between the lower tip of the electrode and the surface of the molten metal in the crucible to form an arc (not shown) between the electrode tip and the molten metal. The heat of the arc causes the metal to melt from the electrode and fall into the crucible. Under desired operating conditions, no side arcs form between the intermediate portion of the electrode 24 and the side wall of the crucible. The electrode is fed downwardly by rollers 26 at a rate equal to that at which the electrode tip is melted, and the crucible bottom is moved down by a suitable control (not shown) to maintain a constant spacing between the lower tip of the electrode 24 and the upper surface of the molten metal.

If unwanted side arcs develop between an intermediate portion of the electrode 24 and the side walls of the side walls of the crucible, the amount of current flowing between the electrode 24 and through resistor 36 is increased. When this reaches a predetermined value, coil 42 of the differential relay is actuated to draw armature 46 against contact 65 and actuate the timer by swinging armature 52 against contact 60. This completes the circuit between source 56 and motor 30, causing the rollers 28 to override rollers 26 and drive electrode 24 down at a rate faster than it is melted. This reduces the spacing and resistance between the lower tip of the electrode 24 and the surface of the molten metal 22, extinguishing the side arcs. The reduction in spacing depends on the time constant of the timer, which can be set for any desired amount. For example, the time can be large enough to permit the lower end of the electrode 24 to contact the surface of the molten metal 22. In such a case, the contact of the electrode with the molten metal is for such a short period of time that there is no danger of the molten metal and the electrode being welded together, since the molten mass will not solidify in the short period of contact.

After a period of time determined by the timer, armature 52 moves to the right against contact 64 for another selected period of time. In this condition the timer completes the circuit between the source 62 and the motor 30, causing rollers 28 to override rollers 26 and move the electrode upwardly. As the electrode moves upwardly the arc is re-ignited between the lower tip of the electrode 24 and the surface of the molten metal. As the arc length increases the amount of current flowing through resistor 36 decreases until coil 42 of differential relay 40 permits the armature 46 to return to its neutral position as shown in Fig. 1. If the arc is longer than a predetermined optimum amount, the voltage drop between the electrode and the melted metal is sufficiently high to actuate coil 44 of the differential relay and draw armature 46 against contact 61. This completes the circuit between source 56 and motor 30, causing the electrode 24 to be moved down until the voltage drop is such that coil 44 in the differential relay permits armature 46 to return to its neutral position.

Thus with the apparatus of Fig. 1 any time undesirable side arcing develops, the electrode is moved toward the molten metal to extinguish the side arcing, and the electrode is then moved away from the molten metal to re-establish the desired spacing for proper operation.

Referring to Fig. 2, the electrode 24 and the molten metal 22 are connected in series with a direct current source 32, a secondary winding 72 of a high current transformer 73, and rollers 26, which move electrode 24 downwardly at a rate equal to that at which the electrode is melted. The primary winding 74 of the high current transformer is connected in series with a second winding 75 of a regulating transformer 76, and the primary winding 77 of the regulating transformer is connected in series with a source 78 of alternating voltage.

With the arrangement shown in Fig. 2, alternating voltage is superimposed on the direct current which is supplied from source 32. Regulating transformer 76 permits the arc between electrode 24 and molten metal 22 to be reduced or completely interrupted in phase with the alternating voltage superimposed on the direct current.

In each cycle of the alternating voltage there is a period when the voltage across the two electrodes is less than that necessary for the normal arc. By using the regulating transformer 76, it is possible to adjust the alternating voltage so that at the moment of maximum opposition to the direct current, the voltage across the electrode is just sufficient to maintain an arc and yet be small enough to insure that there are no side arcs. This condition may be readily determined experimentally. Even if the arc is extinguished, ordinarily no high frequency apparatus is required for re-striking the arc because when the alternating voltage reinforces the direct current, the resulting voltage is sufficient to strike the arc.

Referring to Fig. 3, the electrode 26 and molten metal 22 are furnished direct current from source 32 which has a self-excited coil 80 connected in series with a first variable resistor 82. A second variable resistor 84 and an interrupter 86 are connected in parallel with each other and in series with the variable resistor 82 and self-excited coil 80. In this circuit the interrupter 86 is driven at a constant speed by any suitable means (not shown) so that the current through the self-excited coil is temporarily short circuited past resistor 84. Thus, the setting on resistor 82 controls the maximum current which flows to the self-excited coil, and resistor 84 controls the minimum amount of current which flows through the self-excited coil. With the arrangement of Fig. 3, the current through the self-excited coil may be controlled in much the same manner as that of the apparatus shown in Fig. 2 so that the voltage applied to the electrode is periodically reduced to eliminate or extinguish any side arcs which might form.

We claim:

1. In arc melting apparatus which includes an electrode of the metal to be melted, a crucible for holding metal melted from the electrode, the electrode ordinarily being spaced from the metal in the crucible, and means for passing an arc between the electrode and the metal in the crucible, the combination which comprises means for moving the electrode with respect to the metal in the crucible, means for sensing the amount of current flowing through the electrode, means for sensing the voltage difference between the electrode and the metal in the crucible, means for temporarily reducing and then increasing the spacing between the electrode and metal in the crucible when the current through the electrode exceeds a predetermined value, and means for advancing the electrode toward the metal in the crucible until the voltage between the electrode and metal is reduced to a predetermined value.

2. In arc melting apparatus which includes an electrode of the metal to be melted, a crucible for holding metal melted from the electrode, the electrode ordinarily being spaced from the metal in the crucible, and means for passing an arc between the electrode and the metal in the crucible, the combination which comprises means for moving the electrode with respect to the metal in the crucible, means for sensing the amount of current flowing through the electrode, and means for moving the electrode toward and then away from the metal in the crucible when the current through the electrode exceeds a predetermined value.

3. In arc melting apparatus which includes an electrode of the metal to be melted, a crucible for holding metal melted from the electrode, the electrode ordinarily being spaced from the metal in the crucible, and means for passing an arc between the electrode and the metal in the crucible, the combination which comprises means for moving the electrode with respect to the metal in the crucible, means for sensing the amount of current flowing through the electrode, and means for reducing the spacing between the electrode and metal in the crucible when the current through the electrode exceeds a predetermined value.

4. In arc melting apparatus which includes an electrode of the metal to be melted, a crucible for holding metal melted from the electrode, the electrode ordinarily being spaced from the metal in the crucible, and means for passing an arc between the electrode and the metal in the crucible, the combination which comprises means for adjusting the spacing between the electrode and the metal in the crucible, means for sensing the amount of current flowing through the electrode, and means responsive to the current through the electrode for reducing the said spacing until the electrode touches the metal when the current through the electrode exceeds a predetermined value.

5. In arc melting apparatus which includes a first electrode, a second electrode spaced from the first, and means for passing an arc between the two electrodes to melt a metal, the combination which comprises means for sensing the amount of current passing through one of the electrodes, means for sensing the voltage drop across the electrodes, means responsive to the said current for reducing and then increasing the spacing between the electrodes when the said current exceeds a predetermined value, and means responsive to said voltage for decreasing the spacing between the electrodes when the said voltage exceeds a predetermined value.

References Cited in the file of this patent
UNITED STATES PATENTS

| | | |
|---|---|---|
| 1,447,236 | Chaney | Mar. 6, 1923 |
| 1,479,836 | Saklatwalla et al. | Jan. 8, 1924 |
| 1,573,095 | Saklatwalla et al. | Feb. 16, 1926 |
| 1,646,221 | Seede | Oct. 18, 1927 |
| 2,139,160 | Hebeler | Dec. 6, 1938 |
| 2,173,446 | Heindlhofer | Sept. 19, 1939 |
| 2,761,002 | Laird et al. | Aug. 28, 1956 |